Nov. 13, 1962    T. A. ALBERTSSON ETAL    3,064,161
ELECTRIC SAFETY MEANS
Filed Nov. 18, 1958
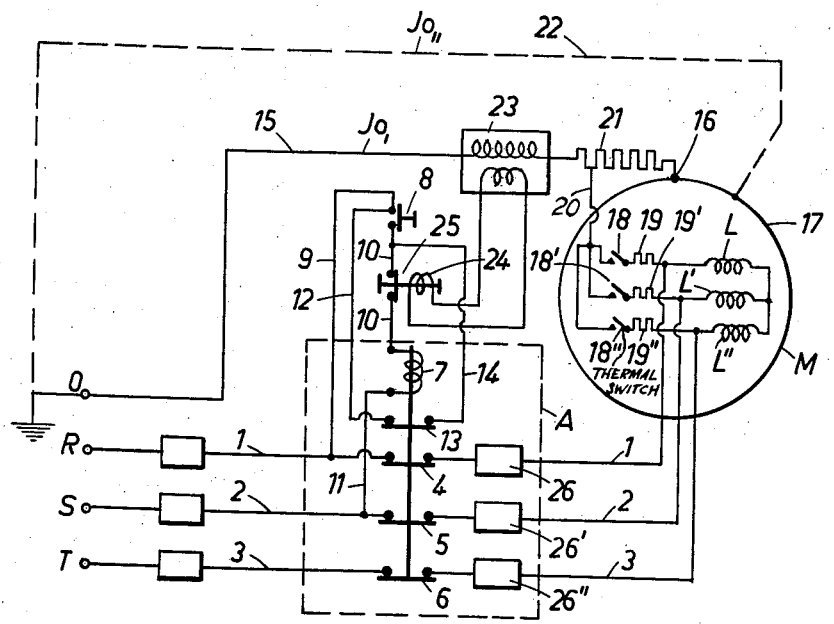

United States Patent Office 3,064,161
Patented Nov. 13, 1962

3,064,161
ELECTRIC SAFETY MEANS
Tor A. Albertsson, Manskensvagan 13, Spanga, Sweden, and Bo A. Abrahamsson, Ostermalmsgatan 58, Stockholm, Sweden
Filed Nov. 18, 1958, Ser. No. 774,762
Claims priority, application Sweden Nov. 18, 1957
3 Claims. (Cl. 317—13)

This invention relates to safety means for motors, transformers and the like and has for its principal object the provision of safety means for protecting windings in such apparatus against overheating.

Customarily thermal relays are provided in the circuit of electric motors, which relays release at excess current and prevent the windings of the motor to be burnt. Such conditions arise for instance at overload of the motor.

However, conditions of working exist in which the temperature of the windings of the motor already in idle motion reaches dangerous limits, not felt by customary protection means, since in this case no excess currents arise.

The main object of the invention is to provide safety means adapted to protect the windings against overheating by the arrangement of a thermally controlled switch located within or adjacent to the winding to be protected of an electric apparatus, one connection of said switch is connected to the respective supply conductor of said apparatus and the other connection is connected to a preselected point of a voltage divider connected in series with a protecting ground lead from the electric apparatus. The ground lead is adapted when energized to release a switch controlling the supply circuit of the apparatus.

A better understanding of the invention will be afforded by the following detailed description considered in conjunction with the accompanying drawing, in which the single FIGURE shows a schematic diagram of connections of the safety system according to the invention.

In the drawing R, S and T designate the phases of a three-phase supply line to an electric apparatus M, such as a three-phase motor. 0 designates a ground lead of the three-phase mains.

Each phase conductor 1, 2, 3 is controlled by a contact 4, 5 and 6 respectively of a contactor generally designated A and shown by dotted lines on the drawing. The contacts 4, 5, 6 of the contactor A are actuated by a solenoid 7, which is energized when closing by a push button main switch 8 a circuit leading from the phase conductor 1 through a leader 9, the switch 8, the leader 10, the solenoid 7 and a leader 11 to the phase conductor 2, thereby closing said contacts 4, 5, 6. After having been initially energized by pressing down the push button 8 said contacts 4, 5, 6 are retained in closed position by a continuous holding current through said solenoid 7 and supplied from the phase conductor 1 through the leaders 9 and 12, an additional contact 13 of the contactor A, the leaders 14 and 10, the coil 7 and the leader 11 to the phase conductor 2.

Thermal relays 26, 26', 26'' are customarily inserted in the phase conductors 1, 2, 3 and aimed for protecting against excess current when the apparatus M is overloaded.

The ground lead 0 is through a conductor 15 in usual manner connected at 16 to the casing 17 of the apparatus M.

According to the invention a thermally controlled switch 18, 18', 18'' respectively is provided for each phase winding L, L', L'' of the apparatus and connected with its one connection to the respective phase conductor and located within or adjacent to the respective electric winding. The other connection of the switches 18—18'' is connected to the ground conductor 15, so that the phase conductors 1, 2, 3 will each be connected with the ground lead 0 at a predetermined temperature of said winding L, L', L'' respectively. A resistance 19, 19', 19'' between the respective switch 18—18'' and the associated phase conductor limits the current and thereby the potential of the casing 17 in relation to ground. Furthermore the leader 20 from said switches 18—18'' is connected to a selected point of a voltage divider 21 connected in series with the ground lead 15.

The voltage divider 21 is inserted to secure a certain minimal current through the ground lead 15 as the "artificial" ground current or second ground connector can take other lines from the casing 17 to ground as is indicated by the dotted line 22 on the drawing.

Assuming the currents in the ground conductor 15 and along said other lines 22 to be $Jo_1$ and $Jo_{11}$ respectively, the sum of these currents $Jo_1 + Jo_{11}$ is the total ground current. Suitable selection of the point of connection of the leader 20 to said voltage divider 21 ensures that the current $Jo_1$ will attain a certain value, necessary for giving a release impulse to a switch relay or a coil as is described below, as the selection will ascertain that when any of the switches 18 or 18' or 18'' closes it will direct the major part of the release current through the lead 15, rather than through the lead 22.

The ground conductor 15 energizes through a current transformer 23 of low current transformation ratio the coil 24 of a relay to an interrupter switch 25 inserted in the leader 10 of the solenoid 7 actuating circuit, to open the same thereby breaking the supply of current to the apparatus M.

The switch 13 is suitably arranged so that even if the push button switch 8 is actuated by a holding current for instance controlled by the excess current relays 26—26'' said switch 25 opens the solenoid 7 circuit. In this manner it is possible in a simple way to obtain an automatic action and the contactor A is retained open only as long as any of the thermally controlled contacts 18—18'' are closed and consequently the temperature of the windings unallowably high.

The invention may of course be carried out in different manners and is not restricted to three phase systems but may generally be used in electric apparatus where a momentary current supply to a ground connection is permitted.

It is to be noted that said momentary current supply through the ground conductor may control the switch for the current supply to the apparatus directly or indirectly by means of suitable sensitive relay and signal circuits known per se whereby the necessary current through the ground conductor can be reduced to a minimum.

We claim:
1. In a system, for protecting against overheating an electric winding forming part of an electric circuit including a feed conduit connected to said winding and operable to feed current to said winding from an electric source, and a ground conduit, the combination of, a thermal switch disposed adjacent said winding and normally being open and having one side connected in parallel to said winding and feed conduit, and having the other side connected to said ground conduit, said thermal switch being operable to close upon the occurrence of excess heat in said winding thereby interconnecting said winding and feed conduit with said ground conduit grounding said winding and feeding a current through said ground conduit when said thermal switch is closed, an interrupter switch disposed in said feed conduit and normally closed for supplying current to said winding and operable to be opened to deenergize said winding, and electric control means energizable by current flowing through said ground conduit and connected to said interrupter switch and operable to open said interrupter switch in response to the flow of a predetermined current through said ground conduit.

2. In a system, as claimed in claim 1, together with, a second ground connector, a voltage divider connected in series between said ground conduit and said second ground connector, said other side of the thermal switch including a contact selectively variably positionable on said voltage divider for the interconnection of said thermal switch to said ground conduit at a selected position between said ground conduit and second ground connector, thereby controlling the current flowing through said ground conduit.

3. In a system, as claimed in claim 1, together with, a resistance connected in series between said winding and said one side of said thermal switch.

References Cited in the file of this patent

UNITED STATES PATENTS

| | | |
|---|---|---|
| 1,513,247 | James | Oct. 28, 1924 |
| 1,774,417 | Barnham | Apr. 26, 1930 |
| 1,830,578 | Vaughan | Nov. 3, 1931 |
| 2,426,071 | Veinott | Aug. 19, 1947 |
| 2,607,831 | Jones | Aug. 19, 1952 |

FOREIGN PATENTS

| | | |
|---|---|---|
| 614,186 | Germany | Apr. 5, 1933 |
| 469,143 | Great Britain | July 30, 1937 |